United States Patent [19]

Heideman

[11] Patent Number: 4,825,031

[45] Date of Patent: Apr. 25, 1989

[54] WELD GUN CONTROL

[75] Inventor: Robert J. Heideman, Westland, Mich.

[73] Assignee: Enertrols, Inc., Westland, Mich.

[21] Appl. No.: 5,682

[22] Filed: Jan. 21, 1987

[51] Int. Cl.⁴ .......................................... B23K 11/10
[52] U.S. Cl. ...................................... 219/89; 219/90; 188/314; 188/318
[58] Field of Search .............. 219/89, 90, 86.1, 78.01; 188/313, 314, 315, 316, 318, 285; 901/42

[56] References Cited

U.S. PATENT DOCUMENTS

| | | | |
|---|---|---|---|
| 2,035,954 | 3/1936 | Focht | 188/314 |
| 2,240,644 | 5/1941 | Focht | 188/315 |
| 4,139,182 | 2/1979 | Nagase et al. | 188/318 X |
| 4,458,131 | 7/1984 | Challenger | 219/89 |

FOREIGN PATENT DOCUMENTS

| | | | |
|---|---|---|---|
| 1962543 | 7/1970 | Fed. Rep. of Germany | 219/90 |
| 78170 | 12/1970 | German Democratic Rep. | 219/90 |
| 52-30947 | 8/1977 | Japan | 219/90 |
| 0001072 | 1/1984 | Japan | 219/89 |
| 585009 | 12/1977 | U.S.S.R. | 219/89 |

*Primary Examiner*—E. A. Goldberg
*Assistant Examiner*—Teresa J. Walberg
*Attorney, Agent, or Firm*—Krass & Young

[57] ABSTRACT

A weld gun assembly including a support structure; a pair of arm members pivotally mounted intermediate their ends on the support structure on a common pivot axis; a weld tip at one end of each arm member; an air cylinder interconnected between the other ends of the arm members and operative when actuated to move the weld tips together in a closing direction; and a pair of hydraulic cushioning devices extending respectively between the support structure and one arm member and between the support structure and the other arm member. The cushioning devices are selectively adjustable to vary the resistance provided to the movement of each arm member toward its closed position so that the resistance to the closing movement of each arm member may be selectively adjusted in compensation for the unbalanced forces that are acting on the individual arm members and thereby ensure that the weld tips arrive at their welding position adjacent the panels to be welded at the same time.

18 Claims, 3 Drawing Sheets

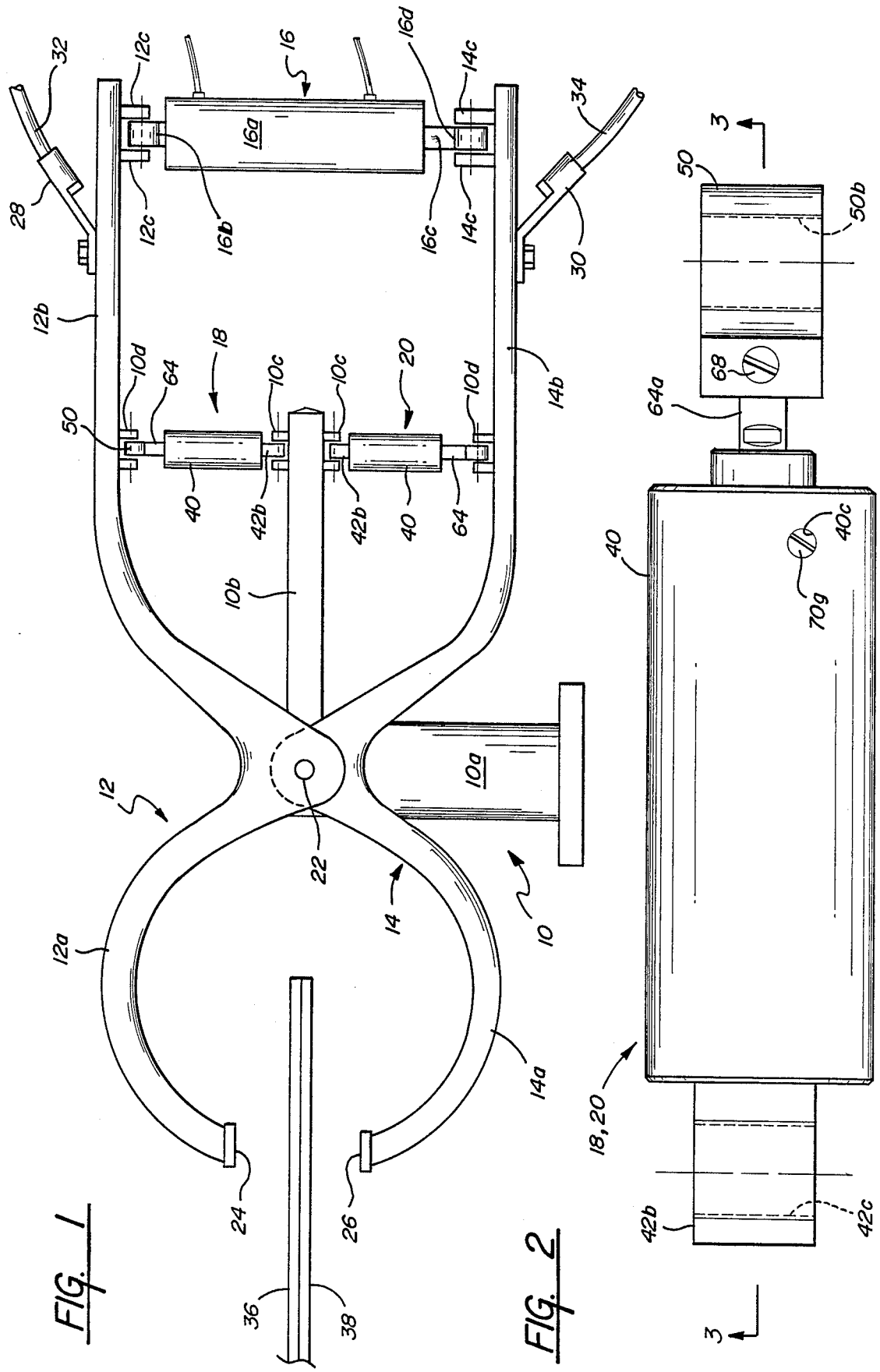

4,825,031

WELD GUN CONTROL

BACKGROUND OF THE INVENTION

This invention relates to weld guns and more particularly to a control device for a weld gun.

Weld guns are commonly used in industry to weld panels or the like together. In a typical weld gun installation, a pair of arms are pivotally mounted intermediate their ends on a support member, a weld tip is provided at one end of each arm, and a power device such as an air cylinder is positioned between the other ends of the arms. In operation, after the panels or the like to be welded have been positioned between the spaced welding tips, the power device is actuated to move the weld tips in a closing direction and into contact with opposite faces of the panels, the weld tips are electrically energized to accomplish the resistance welding operation, and the power device is actuated in the opposite sense to move the weld tips apart.

Whereas these prior art weld guns have been generally satisfactory, there are situations in which the weld tips damage the finish of the members being welded. Specifically, whereas the arms of the gun in their open position are typically stabilized by positive stops, as the arms move away from the stops and move toward their closed position, they are subject to unbalancing forces. As a result, one weld tip often engages the members to be welded before the other tip and the engaged tip thereafter absorbs the reaction force generated by the continued opening movement of the power cylinder. As the engaged tip becomes the reaction point for the final closing movement of the other tip, it digs into the surface of the member to be welded and leaves a dimple in the surface, or in severe cases, badly deforms the member and/or dislodges the member from the associated fixture. In some situations this damage is tolerable but in many situations, for example when welding cosmetic panels such as exterior automobile panels, this damage is not tolerable and requires that the automobile be pulled off of the assembly line and moved to a special repair area where the damage is repaired in an expensive and time consuming operation.

SUMMARY OF THE INVENTION

This invention is directed to the provision of a weld gun which consistently performs the welding operation without damaging the surfaces of the members being welded.

More specifically, this invention is directed to the provision of a weld gun in which the closing movement of the weld tips is carefully and precisely controlled to ensure that both the tips engage the members to be welded at the same time.

In the invention weld gun assembly, an adjustable hydraulic cushioning assembly is provided to controllably resist the closing movement of the tips. The hydraulic cushioning assembly provides precise control of the tip closing movement.

According to a feature of the invention, the hydraulic assembly includes a pair of hydraulic cushioning devices each arranged to extend between a respective arm member of the weld gun and a portion of the support structure for the weld gun. With this arrangement, the closing movement of each weld tip may be carefully controlled and, specifically, the resistance offered to the closing movement of each tip may be individually controlled to ensure that the tips engage the members to be welded at the same time irrespective of unbalancing forces acting on the individual arms.

According to a further feature of the invention, the arm members are pivotally mounted intermediate their ends on the support structure on a common axis, the weld tips are provided on the ends of the arm members at one side of the axis, the power means extend between the ends of the arm members at the other side of the axis, the support frame includes a frame portion positioned at the power means side of the axis and between the arm members, and the hydraulic cushioning devices extend respectively between the frame portion and a respective arm member. This arrangement provides a compact package, provides precise and individual control of the closing movement of the weld tips, and allows easy retrofit of the invention cushioning devices to existing weld gun assemblies.

According to a further feature of the invention, each cushioning device includes a cylinder closed at one end; a piston assembly including a piston positioned within the cylinder and a piston rod projecting out of the other end of the cylinder; means defining a closed loop hydraulic fluid path within the cylinder; and valving means for varying the internal resistance to flow of hydraulic fluid in the closed loop. This specific cushioning device structure provides a compact, inexpensive and readily adjustable assembly for individually controlling the closing movement of the weld tips.

According to a further feature of the invention, each cushioning device includes a bearing member positioned in the open end of the cylinder and including a central axial bore slidably receiving the piston rod; an axial valving bore is provided in the bearing member communicating with and forming a radial enlargement of the central bore; a transverse valving bore opens at its outer end in the outer surface of the cylinder, extends transversely into the bearing member, and tangentially intersects the axial valving bore; and a valve member is adjustably positioned in the transverse valving bore. This arrangement provides an inexpensive and effective means for varying the resistance provided by the cushioning device.

According to a further feature of the invention, each cushioning device further includes an inner tube positioned within the cylinder and defining an annular chamber with the cylinder; the piston is slidably received in the inner tube; port means are provided in the inner tube adjacent the closed end of the cylinder; and passage means are provided in the bearing member extending from the inner end of the transverse valving bore to the annular chamber defined between the inner tube and the cylinder. This arrangement provides an economical and efficient means for providing the closed loop path within the cushioning device, and allows the resistance provided by the closed loop path to be readily adjusted by adjustable movement of the valve member in the transverse valving bore.

According to a further feature of the invention, further passage means are provided in the bearing member extending between the annular chamber and the interior chamber of the inner tube and check valve means are provided in association with these further passage means to allow ready flow of hydraulic fluid from the annular chamber to the interior chamber of the inner tube wall but to preclude fluid flow from the interior chamber of the inner tube to the annular chamber. This arrangement provides a compact and efficient means of allowing the cylinder assembly to readily retract in response to actuation of the power means in a sense to open the weld tips while further providing a separate closed loop path to adjustably resist the closing movement of the weld tips.

BRIEF DESCRIPTION OF THE DRAWINGS

FIG. 1 is a somewhat schematic view of the invention weld gun assembly;

FIG. 2 is a view of a hydraulic control device employed in the weld gun assembly of FIG. 1;

DETAILED DESCRIPTION OF THE PREFERRED EMBODIMENT

Figure 3:
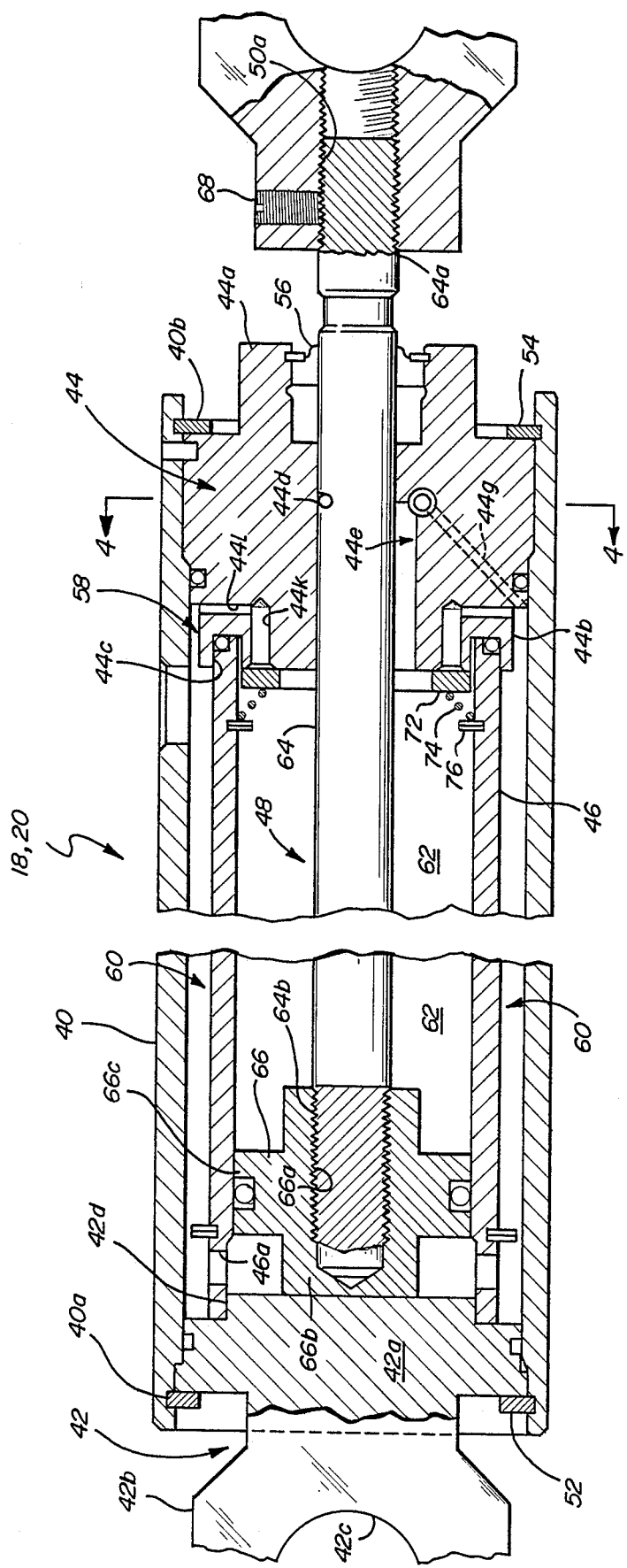
FIG. 3 is a cross sectional view taken on line 3—3 of FIG. 2.
Figure 5:
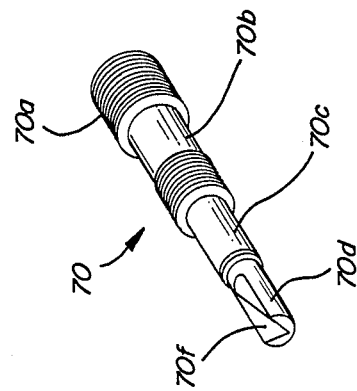
FIG. 5 is a perspective view of a valve member employed in the invention hydraulic control device.
Figure 4:
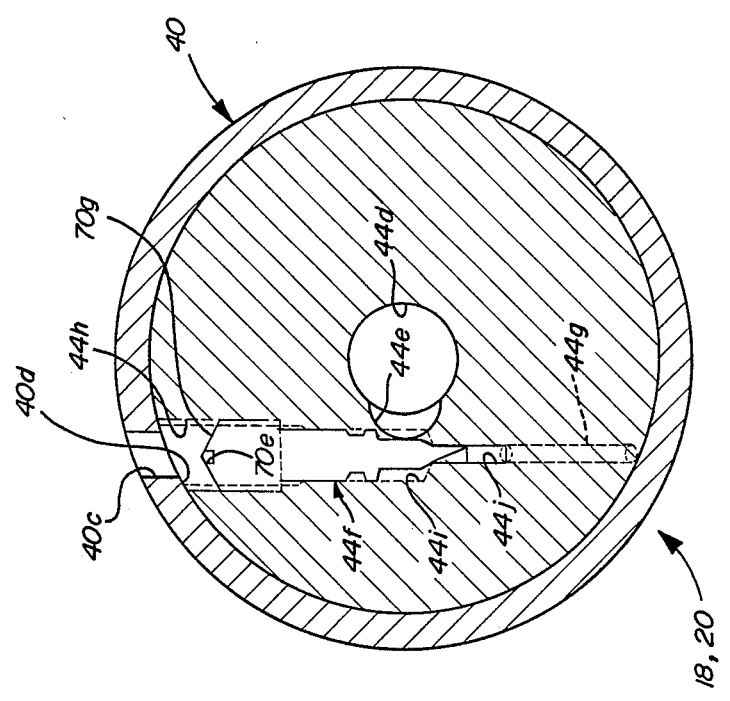
FIG. 4 is a cross sectional view taken on line 4—4 of FIG. 3.

The weld gun assembly as seen in FIG. 1, broadly considered, includes a support structure 10; a pair of arm members 12 and 14; a power member 16; and a pair of hydraulic control devices 18 and 20.

Support structure 10 includes a pedestal portion 10a and an arm portion 10b extending generally at right angles with respect to the upper end of pedestal portion 10a. It will be understood that support structure 10 may comprise a fixedly mounted structure or may be secured to a suitable robotic assembly so as to be movable by the robotic assembly between a plurality of welding locations.

Arm members 12 and 14 are pivotally mounted intermediate their ends to the upper end of support structure pedestal portion 10a by a pivot pin 22 and each include a forward or jaw portion 12a, 14a and a rearward or handle portion 12b, 14b. Weld tips 24,26 are respectively suitably secured to the free ends of arm member jaw portions 12a and 14a. It will be seen that arm members 12 and 14 operate in the manner of tongs or pincers with opening movement of handle portions 12b, 14b, producing closing movement of jaw portions 12a, 14a and closing movement of handle portions 12b, 14b producing opening movement of jaw portions 12a, 14a. Electrical power is provided to arm members 12, 14 and thereby to weld tips 24,26 by terminals 28,30 suitably secured to handle portions 12b, 14b and suitably crimped to electrical cables 32, to 34. It will be understood that arm members 12,14 are suitably insulated from each other, from support structure 10, from power member 16, and from hydraulic control devices 18 and 20 so that the electrical power delivered by cables 32,34 is transferred directly to weld tips 24,26 to accomplish the resistance welding operation of members such as panels 36,38 suitably inserted between the opened weld tips.

Power member 16 may take any of several known forms but preferably includes a double acting air cylinder assembly of known construction. The cylinder 16a of air cylinder assembly 16 is pivotally secured to the outer or free end of arm member handle portion 12b by a clevis 16b pivotally coacting with lugs 12c on arm member handle portion 12b. The lower end of piston rod 16c of the air cylinder assembly is pivotally mounted to the outer or free end of arm member handle portion 14b by a clevis 16d pivotally coacting with lugs 14c on arm member handle portion 14b. It will be understood that actuation of cylinder assembly 16 in an expanding sense operates to move handle portions 12b, 14b apart and move weld tips 24,26 together and that contracting actuation of assembly 16 moves arm member handle portions 12b, 14b together and moves weld tips 24,26 apart.

Hydraulic control devices 18 and 20 are identical and extend respectively between support structure arm portion 10b and arm member handle portion 12b and between support structure arm portion 10b and arm member handle portion 14b.

Each hydraulic control device 18,20 includes an outer tube or cylinder 40; an inner retainer and clevis 42; a bearing member 44; an inner tube 46, a piston assembly 48, and a clevis 50.

Cylinder 40 is of standard tubular form and includes an annular groove 40a adjacent the rearward or closed end of the cylinder; an annular groove 40b adjacent the forward or open end of the cylinder, and a circular port 40c adjacent the open end or forward end of the cylinder.

Inner retainer and clevis 42 includes a plug portion 42a sealingly positioned in the rear end of the cylinder 40 and precluded against outward movement relative to the cylinder by a snap ring 52 received in annular groove 40a, and a clevis portion 42b defining a central aperture 42c for suitable receipt of a clevis pin carried by lugs 10c on support structure arm portion 10a.

Bearing member 44 is sealingly positioned in the open or forward end of cylinder 40 and precluded against outward movement relative to the cylinder by a snap ring 54 received in annular groove 40b. Bearing member 44 includes a hub portion 44a at its forward end housing a wiper seal 56 and a reduced diameter portion 44b at its rearward end defining an annular chamber 58 with the adjacent surface of cylinder 40.

Inner tube 46 is positioned within outer tube or cylinder 40 in spaced relation to cylinder 40 to define an annular chamber 60 therebetween. The rearward end of inner tube 46 is fixedly mounted on a hub portion 42d of member 42 and the forward end of inner tube 46 is sealingly positioned within an annular groove 44c in the rear face of bearing member reduced diameter portion 44b. Annular chamber 60 thus extends from member 42 to bearing member reduced diameter portion 44b where it communicates with annular chamber 58. A plurality of circumferentially spaced ports 46a in the rear end of inner tube 46 provide communication between the interior chamber 62 of inner tube 46 and annular chamber 60.

Piston assembly 48 includes a piston rod 64 and a piston head 66. Piston rod 64 extends slidably through a central through bore 44d in bearing member 44 and includes a forward threaded end portion 64a and a rearward threaded end portion 64b. Piston head 66 includes a threaded central bore 66a for threaded receipt of the threaded rearward end portion 64b of piston rod 64 and includes a reduced diameter button portion 66b at its rearward end for abutting coaction with member 42 in the bottomed out condition of the device. Button portion 66b also serves to space the main body portion 66c of the piston head from the end of the cylinder in the bottomed out condition of the device so as to avoid covering of ports 46a by piston head main body portion 66c.

Clevis 50 includes a threaded central bore 50a for threaded receipt of threaded end portion 64a of piston rod 64 and a central aperture 50b for suitable receipt of a clevis pin carried by lugs 10d on arm members 12,14.

A set screw 68 allows the selective adjustment of the threaded position of piston rod threaded portion 64a in clevis threaded bore 50a so as to selectively vary the effective overall length of the control device.

Bearing member 44 is selectively configured to provide an adjustable high pressure fluid passage therethrough and a separate low pressure fluid passage therethrough.

The high pressure fluid passage through the bearing member is provided by an axial bore 44e forming a radial enlargement of central bore 44d and extending from the rear end of the bearing member, where it communicates with interior volume 62, to an inermediate location within the bearing member; a transverse bore 44f extending inwardly from the outer face of the bearing member; and a passage 44g extending rearwardly in the bearing member from the inner or lower end of bore 44f to annular chamber 58.

Transverse bore 44f includes an upper threaded portion 44h, a main body portion 44i and a reduced diameter inner or lower end portion 44j. Main body portion 44i communicates tangentially with axial bore 44e and the lower or inner end of reduced diameter bore portion 44j communicates with the forward end of passage 44g. Bores 44e, 44f and 44g thus coact to define a high pressure fluid passage through the bearing member extending from interior volume 62 to annular chamber 58. The amount of resistance offered to fluid moving through this high pressure passage is selectively varied by a needle valve member 70 adjustably positioned in transverse bore 44f.

Valve member 70 includes a threaded upper or ourer end portion 70a, a main body portion 70b, and a valving portion 70c including a valving tip 70d. Threaded portion 70a threadably coacts with threaded portion bore 44h; main body portion 70b is slidably and sealingly received in main body bore portion 44i; and valving portion 70c adjustably coacts with reduced diameter bore portion 44j to vary the extent of the resistance offered to movement of hydraulic fluid through the high pressure passage. In the assembled relation of the parts, the upper or outer end of bore 44f is aligned with port 40c in cylinder 40 so that a screwdriver or other suitable tool may be inserted through port 40c for coaction with a slot 70e in the outer end of the valve member to selectively move the valve member axially within bore 44f and selectively vary the position of valve member valving portion 70c relative to reduced diameter bore portion 44j. The position of port 40c in FIG. 2 is displaced from its true position for purposes of clarity. Valving tip portion 70d includes a V-shaped groove 70f to provide a finer and more precise adjustment of the resistance provided to the flow of fluid through the high pressure passage in responses to axial adjustment of valve member 70. The outer end 70g of valve member threaded portion 70a comprises an arcuate conical surface centered on the longitudinal center line of cylinder 40 so that surface 70g moves into conforming seating engagement with the adjacent inner surface 40d of cylinder 40 to define the outer limit of adjustable valve member movement in bore 44f.

A low pressure passage through the bearing member 44 is provided by a series of circumferentially spaced blind bores 44k extending forwardly from the rear face of bearing member reduced diameter portion 44b and a corresponding series of radial bores 44l extending between the blind ends at bores 44k and annular chamber 58. An annular ring 72 is positioned within chamber 62 in covering relation to the rearward openings of axial passages 44k. Ring 72 is maintained in sealing position with respect to bores 44k by a relatively weak coil spring 74 positioned within chamber 62 by a snap ring 76 received in an internal annular groove in inner tube 46. Annular ring 72 functions as a check valve to preclude passage of fluid from interior chamber 62 into bores 44k but to readily allow passage of fluid out of bores 44k into chamber 62.

It will be understood that in the assembled relation of each control device 18,20 an accumulator (not shown) of closed cell sponge material is positioned in annular chamber 60, and the total interior volume of the device is filled with a viscous hydraulic fluid.

In operation of the invention weld gun assembly, air cylinder 16 is selectively actuated to move weld tips 24 and 26 between their open and closed positions. The movement of the tips from their open to their closed position in juxtaposition to panel members 36,38 is adjustively resisted by the high pressure passage in control devices 18 and 20 and the movement of the weld tips from their closed to their open or rest positions is readily allowed by the low pressure passage in control devices 18 and 20. Since there are unbalancing forces acting on arm members 12 and 14 as they move in a tip closing direction, it is necessary to individually adjust control devices 18 and 20 to selectively accommodate the differences in the various forces acting on the arm members 12 and 14. This selective adjustment is accomplished by selected threaded movement of valve members 70 in transverse bores 44f to selectively vary the resistance provided by the high pressure closed loop path and thereby ensure that the weld tips will arrive at their welding position in juxtaposition to the panel members at the same time so as to avoid the prior art problem of one tip arriving before the other and the first tip to arrive thereafter becoming a reaction point for the further closing movement of the other tip with resultant dimpling of the surface engaged by the first tip to arrive.

The invention may be embodied as a complete weld gun assembly as seen in FIG. 1 or, alternatively, the invention may be carried out by retrofitting existing weld gun assemblies with control devices of the type disclosed by the invention. Whether embodied as a total weld gun assembly or as a retrofit to existing weld gun assemblies, the invention provides a ready and efficient means for selectively adjusting the individual movement of the arm members of the weld gun in compensation for the unbalance forces acting on the individual arm members so as to enable the weld tips to arrive in their juxtaposed position adjacent the panels to be welded at the same time.

Whereas a preferred embodiment to the invention has been illustrated and described in detail, it will be apparent that various changes may be made in the disclosed embodiment without departing from the scope or spirit of the invention.

I claim:

1. A weld gun assembly comprising:
   (A) a support structure:
   (B) a pair of arm members each having first and second ends and each pivotally mounted intermediate its ends on said support structure;
   (C) a weld tip at said first end of each arm member;
   (D) a power member interconnected between said second ends of said arm members and operative when actuated to move said weld tips together in a closing direction; and (E) control means comprising an adjustable hydraulic cushioning assembly operative to adjustably control the closing movement of each of said tips, so as to allow said adjustable hydraulic cushioning assembly to be adjusted to assure that each of said weld tips engages members to be welded at substantially the same time.

2. A weld gun assembly according to claim 1 wherein:
(F) said arms are pivoted on a common axis; and
(H) said hydraulic cushioning assembly is arranged to interconnect with said arms at locations between said common pivot axis and said power member.

3. A weld gun assembly according to claim 2 wherein:
(G) said hydraulic cushioning assembly includes a pair of hydraulic cushioning devices each arranged to extend between a respective arm and a portion of said support structure.

4. A weld gun assembly according to claim 3 wherein:
(H) said power means is a double acting air cylinder.

5. A weld gun assembly according to claim 3 wherein:
(H) said cushioning devices are individually adjustable so as to respectively control the closing movement of the respective tips.

6. A weld gun assembly comprising:
(A) a support frame;
(B) first and second arm members;
(C) a weld tip at one end of each arm member;
(D) means mounting said arm members on said support frame for movement between an open, rest position in which said weld tips are spaced to allow insertion of members to be welded therebetween and a closed, welding position in which said weld tips are juxtaposed to the inserted members;
(E) power means extending between said arm members and operative when actuated to move said weld tips between their open and closed positions; and
(F) control means engaging said arm members and comprising an adjustable hydraulic cushioning assembly operative to controllably and adjustably resist the movement of each of said weld tips from their open to their closed position, so as to allow said adjustable hydraulic cushioning assembly to be adjusted to assure that each of said weld tips engages members to be welded at substantially the same time.

7. A weld gun assembly according to claim 6 wherein:
(G) said control means comprises a first hydraulic cushioning device extending between said support structure and said first arm member and a second hydraulic cushioning device extending between said support structure and said second arm member.

8. A weld gun assembly according to claim 7 wherein:
(H) each of said arm members has first and second ends and each arm member is pivotally mounted intermediate its ends on said support structure on a common axis;
(I) said weld tips are on said first ends of said arm members at the other side of said axis;

(J) said power means extends between said second ends of said arm members at the other side of said axis;
(K) said support frame includes a frame portion positioned at said other side of said axis between said arm members; and
(L) said first and second hydraulic cushioning devices extend between said frame portion and said first and second arm members respectively.

9. A weld gun assembly according to claim 8 wherein:
(M) each of said cushioning devices includes means providing a variable resistance to the closing movement of the weld tip carried by the arm member engaged by that cushioning device so that the resistance offered to the closing movement of each weld tip may be individually adjusted.

10. A weld gun assembly according to claim 9 wherein:
(N) each of said cushioning devices includes
(1) a cylinder closed at one end
(2) a piston assembly including a piston positioned within said cylinder and a piston rod projecting out of the other end of said cylinder,
(3) means defining a closed loop hydraulic fluid path within said cylinder, and
(4) valving means for varying the internal resistance to flow of hydraulic fluid in said closed loop path.

11. A weld gun assembly according to claim 10 wherein, for each cushioning device;
(O) said fluid moves in said closed loop path in response to outward extension of said piston rod relative to said cylinder
(P) said device further includes a bearing member positioned in said other end of said cylinder and including a central axial bore slidably receiving said piston rod; and
(Q) said valving means includes a valve member in said bearing member.

12. A weld gun assembly according to claim 11 wherein, for each cushioning device,
(R) said valving means further includes an axial valving bore in said bearing member communicating with and forming a radial enlargement of said central bore, and a transverse valving bore opening at the outer end thereof in the outer surface of said cylinder, extending transversely into said bearing member, and tangentially intersecting said axial valving bore; and
(S) said valve member is adjustably positioned in said transversely extending bore.

13. A weld gun assembly according to claim 12 wherein, for each cushioning device:
(T) said device further includes an inner tube extending from said bearing member to said closed end of said cylinder and defining an annular chamber with said cylinder;
(U) said piston is slidably received in said inner tube;
(V) port means are provided in said inner tube adjacent the closed end of cylinder; and
(W) said closed loop path includes the interior chamber of said inner tube, said axial valving bore, said transverse valving bore, a further valving bore in said bearing member extending from the inner end of said transverse valving bore to said annular chamber, and said port means.

14. A weld gun assembly according to claim 13 wherein, for each cushioning device:
(X) a further closed loop hydraulic path is defined within said cylinder and includes said inner tube interior chamber, said port means, said annular chamber, and passage means extending through said bearing member between said annular chamber and said interior chamber
(Y) said fluid moves in a first direction in said further closed loop path in response to inward movement of said piston rod relative to said cylinder; and
(Z) a check valve is provided in said further closed loop path and said check valve is operative to allow flow of fluid in said first direction through said further closed loop path in response to inward movement of said piston rod and to block flow of fluid in the opposite direction through said further closed loop path in response to outward movement of said piston rod.

15. A weld gun assembly according to claim 14 wherein, for each cushioning device, said check valve is positioned at the opening of said passage means in said interior chamber and includes an annular member positioned in said interior chamber and spring biased into a position covering said opening.

16. A hydraulic cushioning device comprising:
(A) a cylinder closed at one end;
(B) a bearing member positioned in the other end of said cylinder and including a central axial throughbore;
(C) an inner tube positioned within said cylinder in spaced relation thereto and extending from said bearing member to said closed end of said cylinder to define an annular chamber with said cylinder;
(D) a piston assembly including a piston positioned slidably within said inner tube and a piston rod projecting out of the other end of said cylinder through said central bearing member throughbore;
(E) port means in said inner tube adjacent the closed end of said cylinder;
(F) an axial valving bore in said bearing member communicating with and forming a radial enlargement of said central throughbore;
(G) a transverse valving bore opening at its outer end in the outer surface of said cylinder, extending transversely into said bearing member, and tangentially intersecting said axial valving bore;
(H) a further valving bore in said bearing member extending from the inner end of said transverse valving bore to said annular chamber; and
(I) a valve member adjustably positioned in said transverse valve bore and operative to adjustably control the flow of fluid from said axial valving bore to said further valving bore.

17. A hydraulic cushioning device according to claim 16 wherein:
(J) said device further includes passage means in said bearing member extending between said annular chamber and the interior chamber of said inner tube; and
(K) a check valve is provided in said passage means and said check valve is operative to allow flow of fluid through said passage means from said annular chamber to said interior chamber but to block the flow of fluid from said interior chamber to said annular chamber.

18. A hydraulic cushioning device according to claim 17 wherein:
(L) said check valve is positioned at the opening of said passage means in said interior chamber and includes an annular member positioned in said interior chamber and spring biased into a position covering said opening.

* * * * *